United States Patent
Li et al.

(10) Patent No.: US 12,238,236 B2
(45) Date of Patent: Feb. 25, 2025

(54) SCREEN TIME MANAGEMENT ACROSS MULTIPLE DISTRIBUTED DEVICES

(71) Applicant: INNOPEAK TECHNOLOGY, INC., Palo Alto, CA (US)

(72) Inventors: Shiyong Li, Palo Alto, CA (US); Xiaofeng Li, Palo Alto, CA (US); Yiwei Zhao, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 0 days.

(21) Appl. No.: 18/449,692

(22) Filed: Aug. 14, 2023

(65) Prior Publication Data
US 2023/0388391 A1    Nov. 30, 2023

Related U.S. Application Data

(63) Continuation of application No. PCT/US2021/019558, filed on Feb. 25, 2021.

(51) Int. Cl.
   *H04M 1/72409*    (2021.01)
   *H04L 67/50*    (2022.01)
   *H04M 1/72463*    (2021.01)

(52) U.S. Cl.
   CPC ...... *H04M 1/72409* (2021.01); *H04L 67/535* (2022.05); *H04M 1/724631* (2022.02)

(58) Field of Classification Search
CPC ... H04W 4/029; G06F 16/9535; G06Q 30/02; G06Q 50/01; H04L 67/52; H04L 67/10; H04L 67/535; H04L 67/306; H04L 67/02; H04M 1/72409; H04N 1/724631
See application file for complete search history.

(56) References Cited

U.S. PATENT DOCUMENTS

| | | | |
|---|---|---|---|
| 9,369,537 B1 | 6/2016 | Mathew et al. | |
| 9,797,873 B1* | 10/2017 | Feller | G01N 33/00 |
| 2010/0169825 A1* | 7/2010 | Krause | G06F 3/0481 |
| | | | 715/862 |

(Continued)

FOREIGN PATENT DOCUMENTS

| | | |
|---|---|---|
| CN | 106528387 | 3/2017 |
| CN | 107992393 | 5/2018 |
| WO | 2018073649 | 4/2018 |

OTHER PUBLICATIONS

WIPO, International Search Report and Written Opinion for PCT/US2021/019558, May 6, 2021.

(Continued)

*Primary Examiner* — Richard G Keehn
(74) *Attorney, Agent, or Firm* — Hodgson Russ LLP

(57) ABSTRACT

A managing device, a method and a non-transitory computer-readable storage medium are provided for screen time management. The managing device collects screen time data from each of one or more managed devices, and stores the screen time data, the one or more managed devices being managed by the managing device. The managing device calculates overall screen usage time based on the screen time data across a desired subset of the one or more managed device. In response to a screen usage time query, The managing device provides the calculated overall screen usage time to a querying device.

17 Claims, 9 Drawing Sheets

(56) References Cited

U.S. PATENT DOCUMENTS

| | | | |
|---|---|---|---|
| 2010/0317537 A1* | 12/2010 | Tseng | B82Y 30/00 |
| | | | 506/10 |
| 2012/0274508 A1* | 11/2012 | Brown | A63B 24/0062 |
| | | | 342/357.57 |
| 2014/0266794 A1* | 9/2014 | Brown | G16H 40/67 |
| | | | 600/509 |
| 2017/0148302 A1 | 5/2017 | Liu et al. | |
| 2017/0302876 A1 | 10/2017 | Orad et al. | |
| 2019/0037049 A1* | 1/2019 | Raleigh | H04L 12/14 |
| 2019/0373058 A1* | 12/2019 | De Almeida Forjaz de Lacerda | H04W 56/0015 |
| 2020/0174168 A1* | 6/2020 | Barrett | G02B 1/04 |
| 2020/0234474 A1* | 7/2020 | Mittelstädt | G06T 11/001 |
| 2022/0366870 A1* | 11/2022 | Barrett | A61N 5/0618 |
| 2023/0177470 A1* | 6/2023 | Kinomoto | G06Q 10/1091 |
| | | | 705/32 |

OTHER PUBLICATIONS

CNIPA, First Office Action for CN Application No. 202180092948.2, Nov. 27, 2024.

\* cited by examiner

SCREEN TIME MANAGEMENT ACROSS MULTIPLE DISTRIBUTED DEVICES

CROSS-REFERENCE OF RELATED APPLICATIONS

This application is a continuation of International Application No. PCT/US2021/019558, filed Feb. 25, 2021, the entire disclosure of which is incorporated herein by reference.

TECHNICAL FIELD

The present disclosure relates generally to screen time management, and more particularly to a managing device, a method for managing screen time and a non-transitory computer-readable storage medium.

DESCRIPTION OF RELATED ART

The proliferation in availability of electronic/digital devices or systems, such as computers, e.g., personal computers, workstations, laptops, tablets, smartphones, televisions, in-vehicle infotainment systems, etc. allows users to consume content, access information, and so on across many platforms. Moreover, continued improvements in networking and communications allows users to remain connected across such devices. For example, a user may view content on a first device, such as a smartphone while away from home. When the user returns home, that same content that was originally being viewed on the smartphone may transition to being presented (e.g., seamlessly) to a television in the user's home.

Screen time can refer to the amount of time spent using a device with a screen such as the aforementioned smartphones, computers, televisions, as well as other devices, such as wearable devices, e.g., watches, video game consoles, etc. Studies show that screen time directly impacts human (especially child) mental and physical health.

BRIEF SUMMARY OF THE DISCLOSURE

In accordance with some embodiments, a managing device may include a processor, and a memory unit operatively coupled to the processor. The memory unit includes computer code that when executed causes the processor to: collect screen time data from each of one or more managed devices and store the screen time data, the one or more managed devices being managed by the managing device; calculate overall screen usage time based on the screen time data across a desired subset of the one or more managed devices; and in response to a screen usage time query, provide the calculated overall screen usage time to a querying device.

In accordance with some embodiments, a method may include: collecting, by a first computing device of multiple computing devices, activity data from a remaining subset of the multiple computing devices, the remaining subset of the multiple computing devices being managed by the first computing device; calculating, by the first computing device, activity time based on the activity data across one or more computing devices of the remaining subset of the multiple computing devices; and transmitting information reflecting the calculated activity time of the one or more computing devices of the remaining subset of the multiple computing devices.

In accordance with some embodiments, a non-transitory computer-readable storage medium having program codes stored therein is provided. The program codes, when being executed by a processor, cause a method for managing screen time to be implemented. The method include: receiving screen time data transmitted by multiple computing devices, the screen time data comprising screen-on time and screen-off time; calculating overall screen usage time based on a difference between the screen-on time and the screen-off time of each of the multiple computing devices; and providing, in response to a screen usage time query transmitted by a querying device, the calculated overall screen usage time to the querying device.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
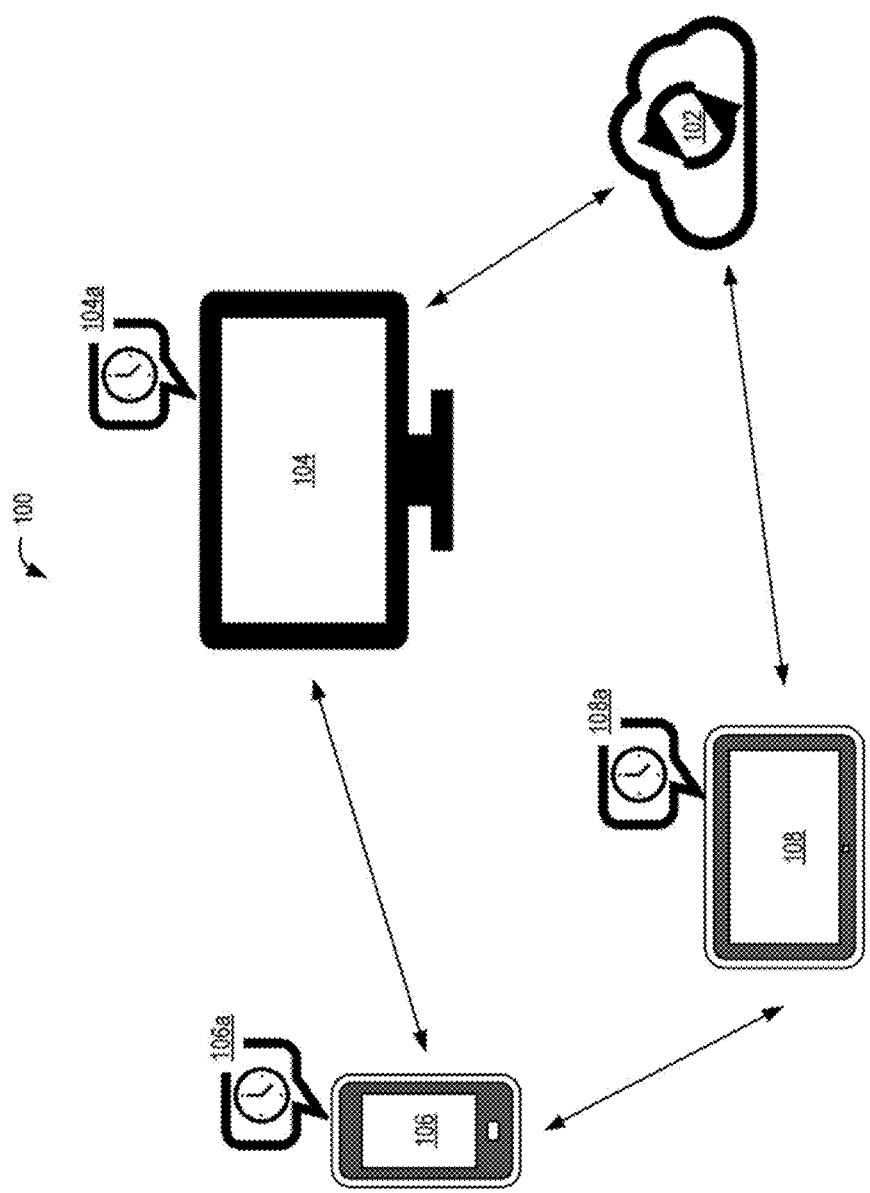
FIG. 1 illustrates an example system in which screen time management in accordance with one embodiment may be implemented.

The figures are not exhaustive and do not limit the present disclosure to the precise form disclosed.

DETAILED DESCRIPTION

As alluded to above, exposure to devices with screens, i.e., screen time, can have health impacts, and there is desire to monitor the amount of time a user spends in front/interacting with a screen. However, as more and more devices with screens are used in daily life, screen time/use management can become increasingly complicated. For example, a typical user or consumer may have multiple devices with screens, such as a smartphone, a smartwatch, and a tablet that he/she uses every day. Because each of these devices has a screen(s) to which the user is exposed, accurate and effective screen time management should consider the amount of screen time associated with each of these devices in the aggregate. Showing all the screen time information together after measuring, transmitting, and calculating screen time across the user's devices automatically allows the user to easily and quickly ascertain the amount of screen time he/she has accrued.

It should be understood that the use of devices may span multiple users as well. For example, different users may share the same (or multiple) device(s), e.g., a parent and a child may share a laptop or television for browsing the web, consuming media content, etc. Thus, accurate screen time usage (as it impacts individual users) should be calculated on a per-account/per-user basis rather than per-device "absolute" usage.

Further still, device usage can include or involve screen-less operation. That is, there may be times or periods during which a user is not necessarily exposed to a device's screen. For example, a digital device may become disconnected from a network, a device's battery may run out of energy, etc. resulting in usage of that digital device ceasing, or resulting in the user interacting with the digital device in a manner that does not involve screen time. For example, during a first period of time, a user may be watching a video on his/her smartphone screen, while during a second period of time, the user may be conducting a voice call (which may not necessarily involve screen usage). Thus, in order for screen time calculations to be accurate, screen time calculations should take into account such exceptions. Other scenarios may arise during which a user is not exposed to a device's screen. For example, the user may lose or put down his/her smartphone while that smartphone is still presenting content on its screen. An assumption that screen time equates solely to device on-time would result in an inaccurate screen time calculation.

Accordingly, various embodiments of the present disclosure are directed to improved screen time tracking/monitoring and management across one or more devices. In particular, various embodiments include systems and methods of aggregating or consolidating screen time usage across multiple devices, rather than monitoring and managing screen time on an individual, per-device basis. Additionally, various embodiments are directed to providing mechanisms that allow different devices to communicate with one another to effectuate better managed and better controlled screen time.

In accordance with some embodiments, a managing device may include a processor, and a memory unit operatively coupled to the processor. The memory unit includes computer code that when executed causes the processor to: collect and store screen time data from each of one or more managed devices, the one or more managed devices being managed by the managing device; calculate overall screen usage time based on the screen time data across a desired subset of the one or more managed devices; and in response to a screen usage time query, provide the calculated overall screen usage time to a querying device.

In some embodiments, the screen time data is stored in a lookup table maintained by the managing device. In some embodiments, the memory unit includes computer code that when executed causes the processor to synchronize the screen time data with a remote copy of the lookup table maintained by a remote server operatively connected to the managing device.

In some embodiments, the screen time data includes device identifying information, screen events occurring or having occurred at each of the one or more managed devices, and timestamps identifying times of the occurrences of the screen events. In some embodiments, the memory unit includes computer code that when executed causes the processor to normalize the timestamps to a universal coordinated time prior to calculating the overall screen usage time. In some embodiments, the memory unit includes computer code that when executed causes the processor to calculate the screen usage time based on a difference between times of the occurrences of the screen events, the screen events comprising screen on and screen off events. In some embodiments, the memory unit includes computer code that when executed causes the processor to exclude screen event exceptions during the calculation of the screen usage time. In some embodiments, the screen event exceptions include at least one of non-operational screen events and overlapping usage screen events.

In some embodiments, the memory unit includes computer code that when executed causes the processor to aggregate screen time data associated with single account usage across multiple managed devices of the one or more managed devices during the calculation of the screen usage time.

In some embodiments, the managing device includes a cloud server operatively communicating with the one or more managed devices.

In some embodiments, the memory unit includes computer code that when executed causes the processor to collect and store screen time data associated with the managing device. In some embodiments, the memory unit includes computer code that when executed causes the processor to aggregate the screen time data associated with the managing device and the screen time data from each of one or more managed devices.

In some embodiments, the memory unit includes computer code that when executed causes the processor to broadcast managing role message. In some embodiments, the memory unit includes computer code that when executed causes the processor to obtain, from a remote server, a copy of the device list identifying each of the one or more managed devices as being associated with a managed role and the managing device as being associated with a managing role. In some embodiments, the memory unit includes computer code that when executed causes the processor to transition to a managed device role upon receipt of a role transition message broadcast from one of the one or more managed devices. In some embodiments, the memory unit includes computer code that when executed causes the processor to synchronize the copy of the device list with an updated device list at the remote server reflecting the transition.

In accordance with another embodiment, a method may include: collecting, by a first computing device of multiple computing devices, activity data from a remaining subset of the multiple computing devices, the remaining subset of the multiple computing devices being managed by the first computing device; calculating, by the first computing device, activity time based on the activity data across one or more computing devices of the remaining subset of the multiple computing devices; and transmitting information reflecting the calculated activity time of the one or more computing devices of the remaining subset of the multiple computing devices.

In some embodiments, each of the multiple computing devices includes at least one of physical and virtual computing devices. In some embodiments, the activity data reflects activity associated with at least one of operations, applications, software components, and groups thereof executing on the at least one of the physical and virtual computing devices. In some embodiments, the method may further include: enforcing activity time limits on the one or more of the remaining subset of the multiple computing devices based on the calculated activity time meeting or approaching activity time limit thresholds.

Users may interact with devices having screens. To accurately measure/monitor screen usage time associated with such devices, one of such devices may assume a managing device role through which remaining devices (assuming managed device roles) may relay respective screen time data. Devices may transition between managing and managed device roles, and queries regarding screen usage time can take into consideration factors such as, overlapping screen time usage (across multiple devices), screen time exceptions, per-account and per-device usage, to name a few.

To accomplish these objectives, a system architecture is used whereby one of multiple devices may be specified to act in a management role (host/managing device) that can manage remaining devices (managed devices), as well as a screen time management cloud server. Various examples of devices are discussed or mentioned herein, but such examples are not meant to be limiting. Use of any device with a screen can equate to screen time. In some embodiments, a managed device may collect screen time related or relevant data, while a managing device receives and stores managed devices' screen time data (while collecting its own screen time data). A query function may be provided that can respond to screen time queries/generate screen time metrics. A screen time management cloud server may be used as backup storage for screen time data, and may coordinate changing roles (managing/managed) across the multiple devices.

A particular data structure can be used in order to efficiently and easily manage distributed screen time data (across multiple devices). Such a data structure can take the form of a lookup table or similar structure that holds/maintains screen time data/information of all relevant devices, e.g., all devices (with screens) associated by a particular content consumption account, e.g., streaming service account, all devices with screens associated by a common user(s), etc. Certain screen time calculation algorithms may be used to calculate an aggregate amount of actual screen time across multiple devices, actual screen time accounting for screen time exceptions, e.g., screen off time, device downtime/failure, overlapping screen time usage, etc. Further still, accuracy in screen time calculations can be addressed at least in part with precision time-related determinations, e.g., considering time zones digital device usage. As alluded to above, various embodiments provide the ability to query screen time metrics/information from or regarding any digital device, and can accommodate authentication or authorized screen time data gathering/release of screen time metrics if need be.

A communications framework spanning the aforementioned managing device, managed devices, and screen time management cloud server is provided that allows screen time data from managed devices to be accurately captured by a managing device. The communications framework may further allow screen time data to be synchronized between the screen time management cloud server and the managing device, and allows for the transitioning of managing/managed roles amongst digital devices.

FIG. 1 illustrates an example system 100 in which screen time management in accordance with some embodiments may be implemented. As illustrated in FIG. 1, example system 100 may include multiple devices, e.g., a television/monitor 104, a smartphone 106, and a tablet 108. Additionally, example system 100 may also include a cloud server 102. The aforementioned devices may each include a screen with which a user of each of devices may interact. For example, a user may interact with television 104 by consuming media content, such as an on-demand movie presented on a screen of television 104. Likewise, a user may control operations of smartphone 106, send/receive text messages, etc. using a screen of smartphone 106, while a user may similarly read an e-publication, draft an email, and perform other operations involving use of a screen of tablet 108.

The use of each of television 104, smartphone 106, and tablet 108 results in a corresponding amount of time (in accordance with some unit of time measurement, e.g., seconds, minutes, hours, etc.) associated with screen usage, i.e., screen time 104a-108a, respectively. For example, a user sending/receiving text messages using smartphone 106 may result in an amount of screen time commensurate with the amount of time that the user sends/receives/reads such text messages. As alluded to above, however, screen time may not necessarily equate to the time of use of a particular device(s) for a particular operation(s), e.g., screen time exceptions. For example, in between sending a text message and reading a received text message, the user may put down smartphone 106 and cease viewing smartphone 106's screen, the user may lock the screen of smartphone 106, again resulting in non-use of smartphone 106's screen. For example, overlapping usage of multiple devices may occur, where a user may be sending/receiving text messages on smartphone 106 while simultaneously watching a movie on television 104. Some devices, such as a desktop computers (not shown) may be operationally associated with multiple screens and possibly overlapping screen use. There are a myriad of other/additional examples of screen usage resulting in some amount or duration of screen time understood to exist by those of ordinary skill in the art and which are contemplated or considered in accordance with various embodiments. Monitoring and determining the amount of screen time accumulated through use of a device's screen(s) can vary, e.g., through some calculation(s) involving a differential between screen on/screen off times, extrapolating screen time through device on/off times, etc., as will be discussed in greater detail below.

Cloud server 102 may include a physical (or virtual) computing device/apparatus or other infrastructure adapted to perform application and information-processing storage. In some embodiments, cloud server 102 may be created using virtualization software to process certain workloads and store information. For example, in this context of screen time management, cloud server 102 may be a screen time management cloud server adapted to receive and store screen time related data or information from one or more devices, such as television 104, smartphone 106, and tablet 108. As will be described in greater detail below, cloud server 102 may be configured to operate as an always-on back up mechanism for screen time related/relevant data, as well as effectuate role changes/transitions regarding devices, such as television 104, smartphone 106, and tablet 108.

In such a system 100, a user of any one or more of television 104, smartphone 106, and tablet 108 may wish to determine how much screen time he/she has accrued over a given time period. In such a system 100, an application or mechanism, such as a screen time usage application resident on/executable on a device, e.g., tablet 108 may request/formulate a query to determine the amount of time its screen has been used.

Figure 2:
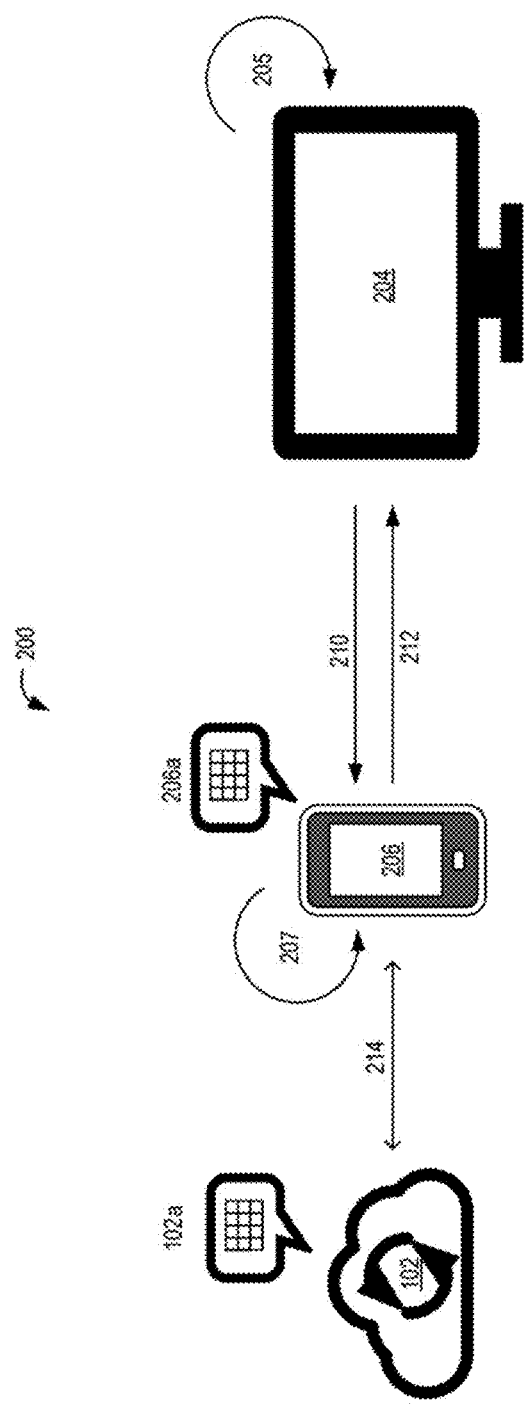
FIG. 2 illustrates an example system architecture with defined device roles for effectuating screen time management in accordance with one embodiment.

FIG. 2 illustrates an example system architecture 200 with defined device roles for effectuating screen time management in accordance with some embodiments. In some embodiments, system 200 may be a distributed network including a first device acting/configured to act in a managing role (also referred to as a host/managing device 206, which may be an embodiment of smartphone 106), a second device 204 which may be an embodiment of television 104 that is managed by managing device 206, and a cloud server 102. As illustrated in FIG. 2, each device may communicate with each other to send or receive data, running/operating as either a managing or managed device. It should be understood that in some embodiments, a single device operates in managing role/mode at any time point.

Managed device 204 collects screen time/screen time-related data or information such as device name, device ID, wall clock time, screen on time, screen off time, uptime, etc. It should be understood that uptime can refer to the time during which a device, e.g., managed device 204 boots up from a cold start. It should also be noted that uptime can include time/time periods that a screen is off after suspending device operation. In some embodiments, uptime can be used as a reference to justify whether calculated screen time is reasonable, e.g., a check can be performed to determine if screen-on time < uptime. Managed device 204 may collect screen time data in an operation 205, and send such data to managing device 206 at an operation 210 periodically or at some specified time (e.g., at a time commensurate with the turning on/off of the screen of managed device 204).

Managing device 206 is responsible to receive and store such data from different managed devices, e.g., managed device 204, and to provide query functionality for a user to query or generate screen time metrics (e.g., calculate aggregate screen time for multiple devices or individual screen time for different devices respectively). It should be understood that managing device 206 collects and stores its own screen time data at an operation 207, and in some embodiments, may transmit an acknowledgement or confirmation to managed device 204 at an operation 212. It should be noted that in accordance with some embodiments, a managed device's screen time can be checked by a managing device at any time. System 200 is an example only, and any number of devices may be managed by a managing device.

Cloud server 102 may operate in an always-on role to back up screen time data and coordinate role changes, as alluded to above. Managing device 206 may synchronize data to the cloud server 102 at an operation 214 periodically or at some specified time (such as when managing device 206's screen is off and/or when it transitions from operating as a managing device to a managed device). It should be understood that cloud server 102 need not necessarily be implemented in the cloud. In some embodiments, cloud server 102's functionality can be implemented, e.g., as software in a device, such as a currently active device in system 200, so as long as other devices have a chance to communicate their respective screen time data to it.

Both managing device 206 and cloud server 102 may maintain/manage received and stored screen time data in respective data structures, such as a lookup table 206a and 102a, respectively. In some embodiments, lookup table 206a may be a real-time or current operating lookup table, while lookup table 102a maintained by cloud server 102 may be a copy/backup version of lookup table 206a. Examples described and illustrated herein are not meant to be limiting, and other data structures may be used in accordance with other embodiments.

That is, and to efficiently and easily manage distributed device screen time, managing device 206 maintains a data structure (lookup table 206a) to record screen time information of all interested devices (managing and managed devices). Lookup table 206a may have a data structure including rows and columns, such as that set forth below in Table 1. In practice, a database or data repository like SQLite can be used to implement such a lookup table. For example, as set forth in Table 1, the name associated with each device may be maintained, along with a device ID. As noted above relevant screen time data can be include screen event times, such as screen on and screen off times. In Table 1, each type of screen event time may be logged/stored (the difference of which can be used to determine screen time, for example).

TABLE 1

| Device name | ID | Screen event time | Type | Log Time |
|---|---|---|---|---|
| John's phone | 123-456 | 13:20:10@2020 Nov. 1 | Screen on | 13:20:11@2020 Nov. 1 |
| John's phone | 123-456 | 13:20:20@2020 Nov. 1 | Screen off | 13:20:20@2020 Nov. 1 |
| John's tablet | 123-789 | 14:30:00@2020 Nov. 1 | Screen on | 14:30:01@2020 Nov. 1 |
| John's tablet | 123-789 | 15:00:00@2020 Nov. 1 | Screen off | 15:00:00@2020 Nov. 1 |
| John's TV | 456-789 | 19:01:00@2020 Nov. 2 | Screen on | 19:01:01@2020 Nov. 2 |
| ... | ... | ... | ... | ... |

To manage roles of different distributed devices, cloud server 102 maintains a device list to record those devices (managing and managed) on the network involved in screen time management. The device list indicates which device is operating in a managing role or managed role. In the example system of FIG. 2, managing device 206 receives a device list from cloud server 102, and cloud server 102 is responsible for updating the device list if a device role(s) changes. One entry of such a device list may be structured as set forth below in Table 2.

TABLE 2

| Device name | ID | Role | Role Change Time (UTC) |
|---|---|---|---|
| John's phone | 123-456 | managing | 13:20:11@2020 Nov. 1 |

For the sake of privacy, all data stored (i.e., look up tables and device lists) may be stored with some encryption method (e.g., a file-based encryption) to prevent an unauthorized account(s) or device(s) from accessing the data. The encryption key can be securely stored locally or on cloud server 102 which is accessible only by an authorized account(s) or device(s). Other security/privacy mechanisms may be used to protect such data as would be understood by those skilled in the art.

Based on a lookup table, screen time can be calculated to reflect screen-on time across multiple devices in the aggregate or for a specified period of time.

Calculating an individual device's aggregate screen time, in accordance with some embodiments, may be performed using the following algorithm/pseudo-algorithm. For example, calculated screen time is associated with a particular device ID. If a previous screen event was a screen on event, and a current screen event is a screen off event, the aggregate screen time for the device is an existing (previously calculated) aggregate screen time value in addition to the difference between a time associated with the previous screen on event and a time associated with the current screen off event.

```
void onScreenEventTimeReceived(deviceId, eventType, eventTime)
{
ScreenTime st = &screenTimeData[deviceId];
if (st.previousEventType == SCREEN_ON && eventType ==
SCREEN_OFF) {
st. aggregateTime = st.aggregateTime + (eventTime −
st.lastOnEventTime)
}
if (st.previousEventType == SCREEN_OFF && eventType ==
SCREEN_ON) {
st.lastOnEventTime = eventTime;
    }
    st.previousEventType = eventType;
  }
```

If multiple devices are used during specified period, overlap screen time across devices, as well as unexpected network or device failure(s) should be taken into account as follows. It should be understood that an onScreenEventTimeReceived( ) function may be called to push device screen time information from a managed device to an event queue in order. Additionally, a getScreenTimeAcorssdevices( ) function may be called to calculate device screen time during a specified period (from "startTime" to "endTime"), which takes overlapping or device failure case into account. In particular, event type of and time information can be appended into an event queue (which can be a first-in-first-out queue). Aggregate screen time can then be obtained by iterating through the aforementioned FIFO screen event queue. If any recorded events occur outside of a specified period (e.g., specified period in a screen time query), such events can be filtered out. A reference count of screen on events across the relevant devices can be recorded, accounting for exceptions that can be considered screen failures not be counted, where a reference screen on event count greater than one suggests at least one screen of a device is on. It should be understood that the use of a reference counter can address overlapping screen scenarios, where if multiple, e.g., two devices have screen on events, without either turning off, an assumption can be made that an overlapping screen usage scenario is occurring. The second screen on event can be ignored in some embodiments.

```
void onScreenEventTimeReceived(deviceId, eventType, eventTime)
{
...
//append event type and time into event FIFO queue
userScreenTime.eventQueue.add(eventType, eventTime)
// the codes to handle other screen time data record
...
}
Long getScreenTimeAcrossDevices(startTime, endTime)
{
```

-continued

```
Int onRefCount=0;
Long screenTime, onStartTime = 0;
EventData newEventData = userScreen Time. eventQueue.first( );
...
// iterate event FIFO queue to calculate screen time
While (newEventData) {
eventData ea = newEventData;
// filter out events happening out of specified period
if (ea.eventTime < startTime) {
newEventData = ea.hasNext ( ) ? ea.next( ) : null;
continue;
}
if (ea.eventTime > endTime) {
if (onRefCount > 0 ) {
screenTime += endTime − onStartTime;
}
break;
}
// record reference count of screen-on across multiple devices
if (ea.eventType == SCREEN_ON) {
onRefCount++;
}
// suppose that other issue like network or device problems gets
// logged as SCREEK_FAILURE somehow
else (onRefCount >= 0 &&
(ea.eventType == SCREEN_OFF || ea. eventType ==
SCREEN_FAILURE)) { onRefCount−−;
}
// if onRefCount > 0, at least one device screens are ON
If (onRefCount == ) {
onStartTime = ea.eventTime;
} else if (onRefCount == 0 ) {
screenTime += ea.eventTime − onStartTime;
}
...
newEventData = ea.hasNext( ) ? ea.next( ) : null;
}
return screenTime;
}
```

Figure 3:
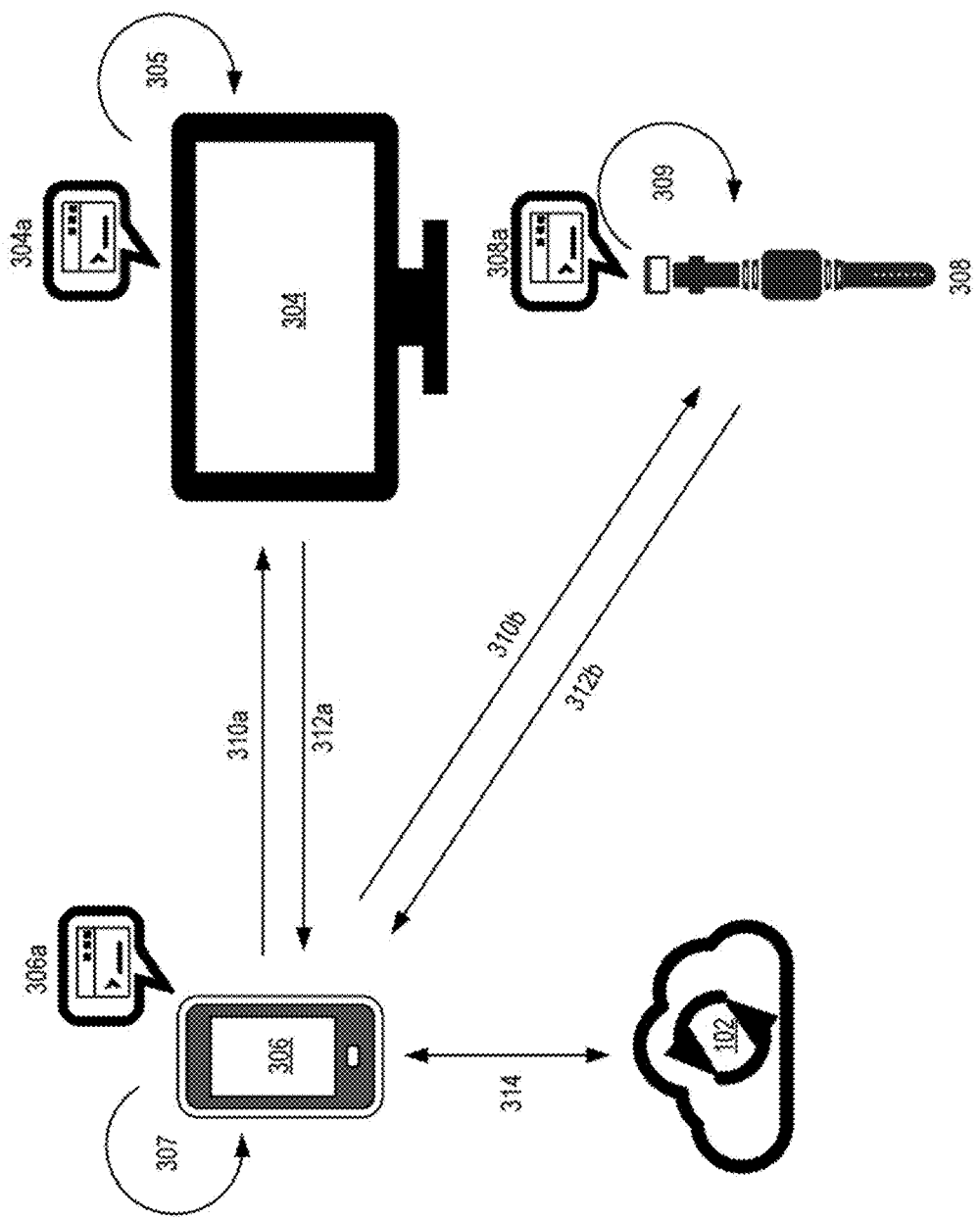
FIG. 3 illustrates an example communication process between devices in accordance with one embodiment.

FIG. 3 illustrates an example communication process between devices in a network in accordance with some embodiments. During communications between managing and managed devices, a managing device is responsible for obtaining/receiving input data in the form of screen time data, addressing screen time data conflicts (e.g., overriding old/non-current screen time data), merging screen time data from one or more devices, and storing screen time data in a lookup table, e.g., lookup table 206a (FIG. 2). Such device communications further support the synchronization of screen time data to cloud server 102 periodically or at some specified time (as already discussed above). Accordingly, when a user initiates a screen time, e.g., on a managing device, the relevant screen time data will be accessed to calculate the screen time associated with the relevant devices.

It should be understood that each device may execute an application or service for managing screen time. Such an application allows a particular device to act as/implement a particular role, e.g., a managing role and a managed role. A managing device, in this example, managing device 306 (which may be an embodiment of smartphone 106) may broadcast managing role messages to managed devices (in this example, TV 304 and smartwatch 308) in managing device 306's device list (obtained from cloud server 102) to claim the managing role.

A device may claim the managing role by virtue of random assignment as the managing device, e.g., a particular device may be randomly selected from the device list to act as a managing device. For example, cloud server 102 may analyze its resident device list, randomly select a particular device, and communicate an instruction to that device, in this example, device 306 to claim the managing role. In other embodiments, a managing device may be selected pursuant to a user query being initiated on that device. For example, a user using smartphone 306 may wish to determine his/her screen time, and may, via the aforementioned screen management application, initiate a query on smartphone 306. In response, smartphone 306 may designate itself to be the managing device for the network at that time. Other methods of determining which of multiple devices may act as a managing device can be used in accordance with other embodiments. If no device list is available, smartphone 306 may perform a scan, perform some form of packet inspection, ping/receive acknowledgements, etc. to determine the devices operative on its network to build/rebuild a device list prior to broadcasting its managing role message.

As illustrated in FIG. 3, such a message is broadcast at operations 310a/310b. In this way, smartphone 306 claims the managing role and may be reflected as such in its corresponding screen time management application 306a (and TV 304 and smartwatch 308 are relegated to managed roles reflected in their respective screen time management applications 304a, 308a).

Managed devices, in this example, TV 304 and smartwatch 308 (as described above), collect/store screen time data at operations 305 and 309, while smartphone 306 also collects/stores its own screen time data at operation 307. Managed devices may communicate to their respective system level software, e.g., operating system, to ascertain when their screens are enabled or disabled, e.g., turned on or turned off. This screen time data can be transmitted to the current managing device, in this case, smartphone 306.

In some embodiments, based on the device list obtained from cloud server 102, the managing device, i.e., smartphone 306, via the screen time management application/software, may send triggers to each device on the device list, in this example, TV 304 and smartwatch 308, requesting screen time data may be transmitted to the managing device, e.g., at respective operations 312a and 312b. In other embodiments, managed devices may simply attempt to transmit data at the proper time. It should be noted that this data can be transmitted in accordance with standard/known inter-device communication methods, e.g., in accordance with message queuing, remote procedure call (RPC), and the like. That is, a managed device, such as TV 304, may transmit its current/latest screen-on time (T1 time) to smartphone 306, and then a screen-off (T2 time) may be sent at the time when TV 304 goes into some sleep mode indicative of non-screen-usage, e.g., when a screen saver turns on, when screen backlighting turns off, or other device-specific indicator of a screen off event occurs.

It should be understood that different devices may have different screen events that indicate screen on/off times, and various embodiments contemplate leveraging such indicators as needed. For example, the screen time management application may be adapted for use on different devices, and may thus be configured to receive such indicators/screen events. In some embodiments, the screen time management application may tap into existing device mechanisms/data for ascertaining relevant screen events. In some embodiments, the screen time management application may compare device operating conditions or states against relevant thresholds, e.g., whether or not some threshold power is being delivered to pixels for some threshold amount of time, etc.

The screen time management application/software running on the managing device, in this example smartphone 306, may receive every managed device's screen time data at operations 312a and 312b. Smartphone 306 may record the received screen time data in its lookup table (e.g., the T1 and T2 time values). Using the aforementioned functions/calculations, the screen time of TV 304 can be calculated as the difference of the two time values.

At an operation 314, the managing device, i.e., smartphone 306, may synchronize its look up table data with that of cloud server 102. That is the current screen time data recorded by smartphone 306 may be used to update the lookup table copy maintained by cloud server 102. Such updating can occur pursuant to receipt of screen time data by smartphone 306, periodically at some configurable interval, etc.

Referring back to cloud server 102 operating to coordinate managing/managed role transitions among devices, upon transmission of a managing role message, smartphone 306 may separately communicate to cloud server 102 that it has claimed the managing role, and cloud server 102 may update its device list. In other embodiments (not shown), smartphone 306 may include cloud server 102 when broadcasting its managing role message, so that cloud server 102 may also become aware of the role/role transition involving smartphone 306. In still other embodiments, cloud server 102 may monitor with which device, screen time data is synchronized to determine which device is an acting managing device, the screen time management applications on each device may periodically communicate each device's current/active role, etc. Alternatively still, cloud server 102 may periodically access its device list and may ping the listed managing device.

Figure 4A:
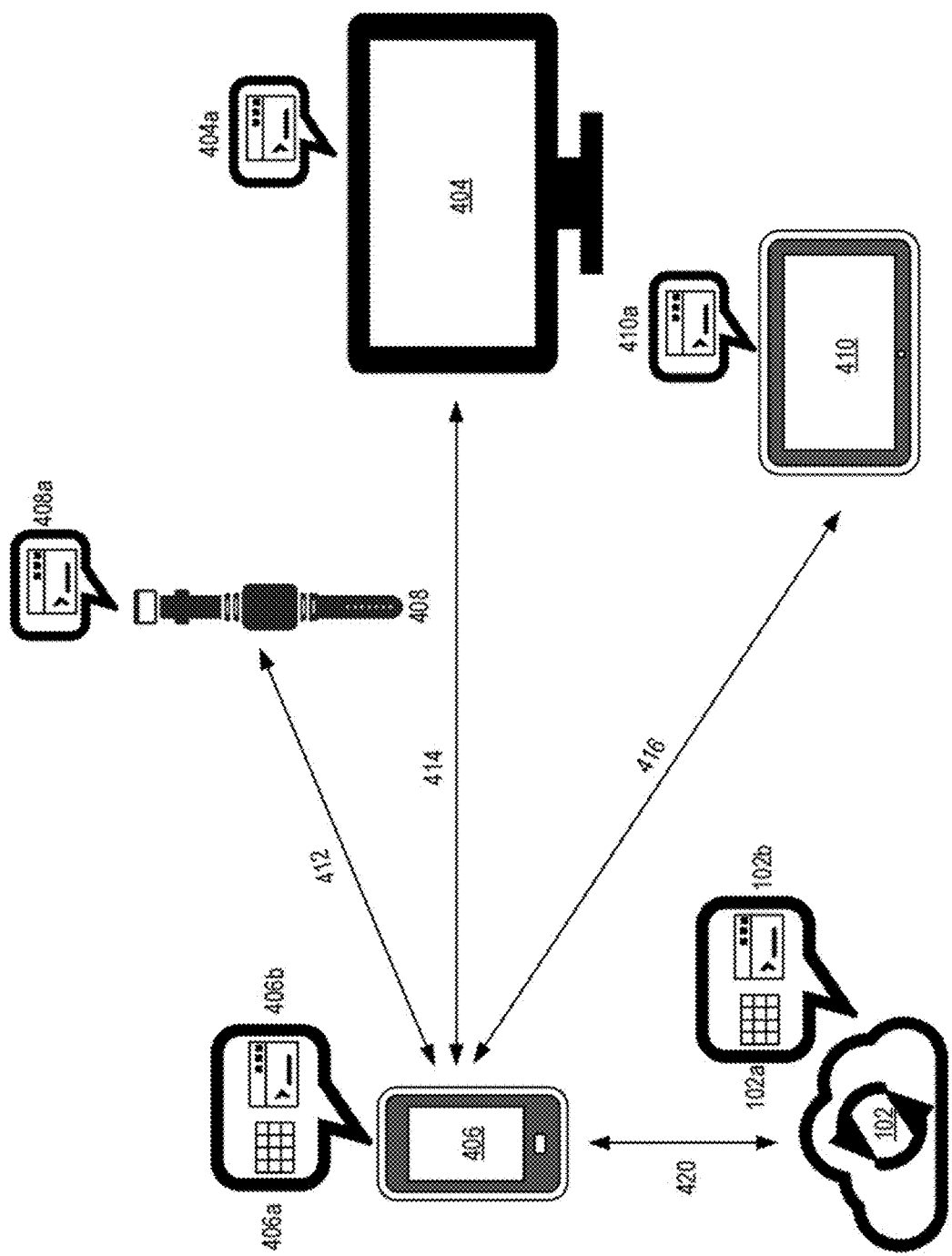
FIG. 4A illustrates an example of screen time management using a managing device in accordance with one embodiment.

FIG. 4A illustrates an example of screen time management using a managing device in accordance with some embodiments. As noted above, a device may be assigned or may assume a managing device role. As a managing device, smartphone 406 may maintain a lookup table 406a in which managed devices are listed. The corresponding screen time management application 406b may also be designated/denoted accordingly (as being a managing application). In this example, smartphone 406 may be an acting managing device. As illustrated in FIG. 4A, smartwatch 408, TV 404, and tablet 410 may be managed devices (each with a corresponding screen time management application 408a, 404a, 410a correspondingly designated/considered to be a managed application). Cloud server 102 may, as discussed above, maintain its own copy 102a of lookup table 406a (maintained by the managing device, in this example, smartphone 406). In some embodiments, cloud server 102 may also be running its own/local version or copy of the screen time management application 102b (that can include role transition/management functionality).

In this embodiment, cloud server 102 may coordinate the transmission or uploading the respective screen time data of each managed device (TV 404, smartwatch 408, tablet 410) to the managing device, in this example, smartphone 406. Typically, the managing device may collect screen time data from each managed device, and sync that data to cloud server 102. However, in some embodiments, e.g., in the event of an unexpected managing device failure or power off event, cloud server 102 may detect such events. Cloud server 102 may coordinate with the managed devices for the transmission of their respective screen time data to cloud server 102, or to a new managing device. Moreover, cloud server 102 may receive the respective screen time data of the managed devices (TV 404, smartwatch 408, tablet 410) from smartphone 406, upon collecting the screen time data during a synchronization operation 420 such that the lookup table 102a of cloud server 102 can be updated with the latest/current screen time data from the network.

Figure 4B:
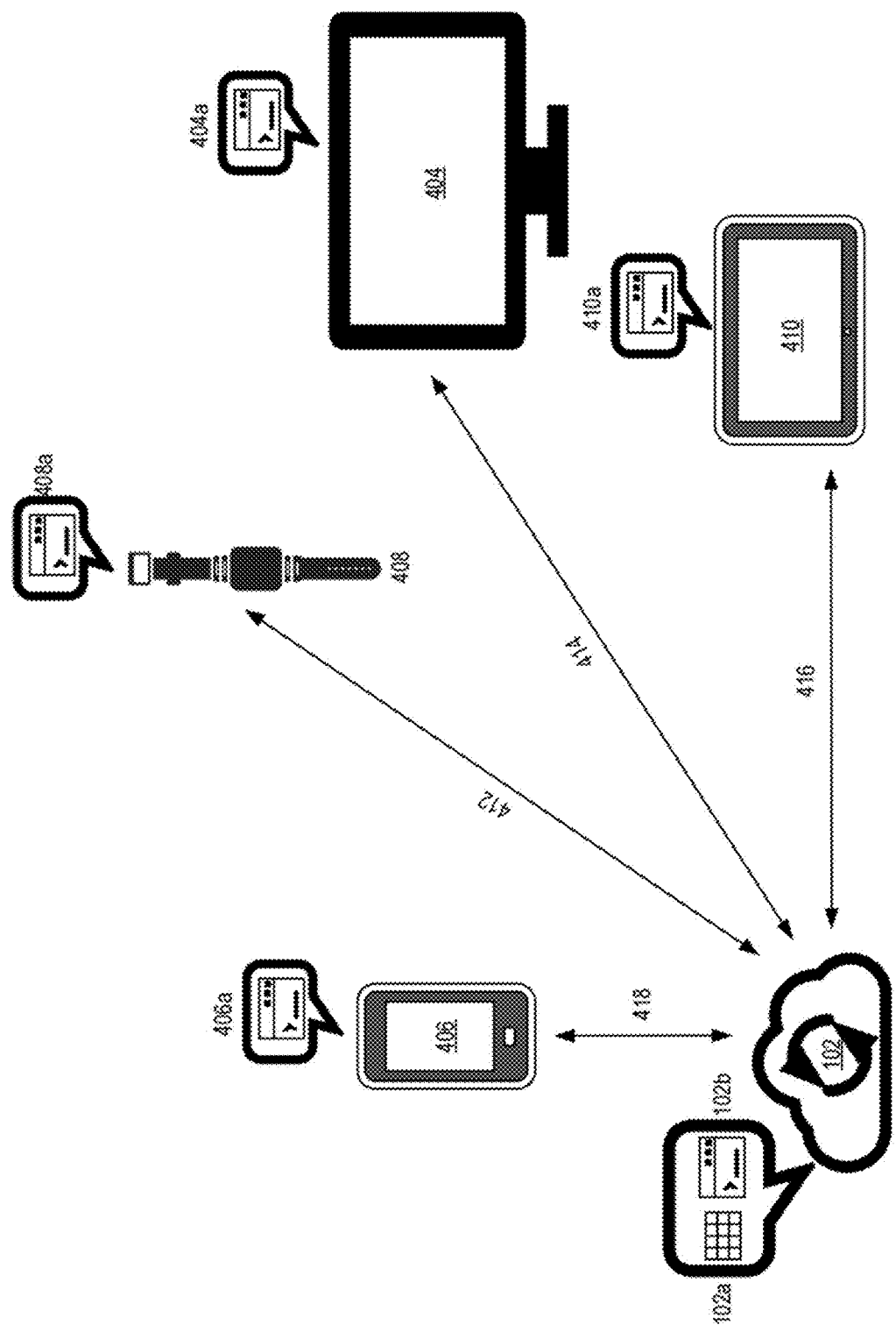
FIG. 4B illustrates an example of screen time management without use of a managing device in accordance with one embodiment.

FIG. 4B illustrates an example of screen time management without use of a managing device in accordance with some embodiments. In some embodiments, a device need not be appointed to act as a managing device. Rather, cloud server 102 may assume managing device functionality. As illustrated in FIG. 4B, and similar to FIG. 4A, smartwatch 408, TV 404, and tablet 410 may be managed devices (each with a corresponding screen time management application 408a, 404a, 410a correspondingly designated/considered to be a managed application). Cloud server 102 may be running its own/local version or copy of the screen time management application 102b (that can include role transition/management functionality). However, instead of maintaining a local copy of a managing device's lookup table, cloud server 102 can control/manage the "main" lookup table 102a in which device's respective screen time data can be stored. Thus, smartphone 406 may simply be another managed device (with a corresponding managed screen time management application 406b) which transmits its screen time data to cloud server 102 at an operation 418.

Figure 5:
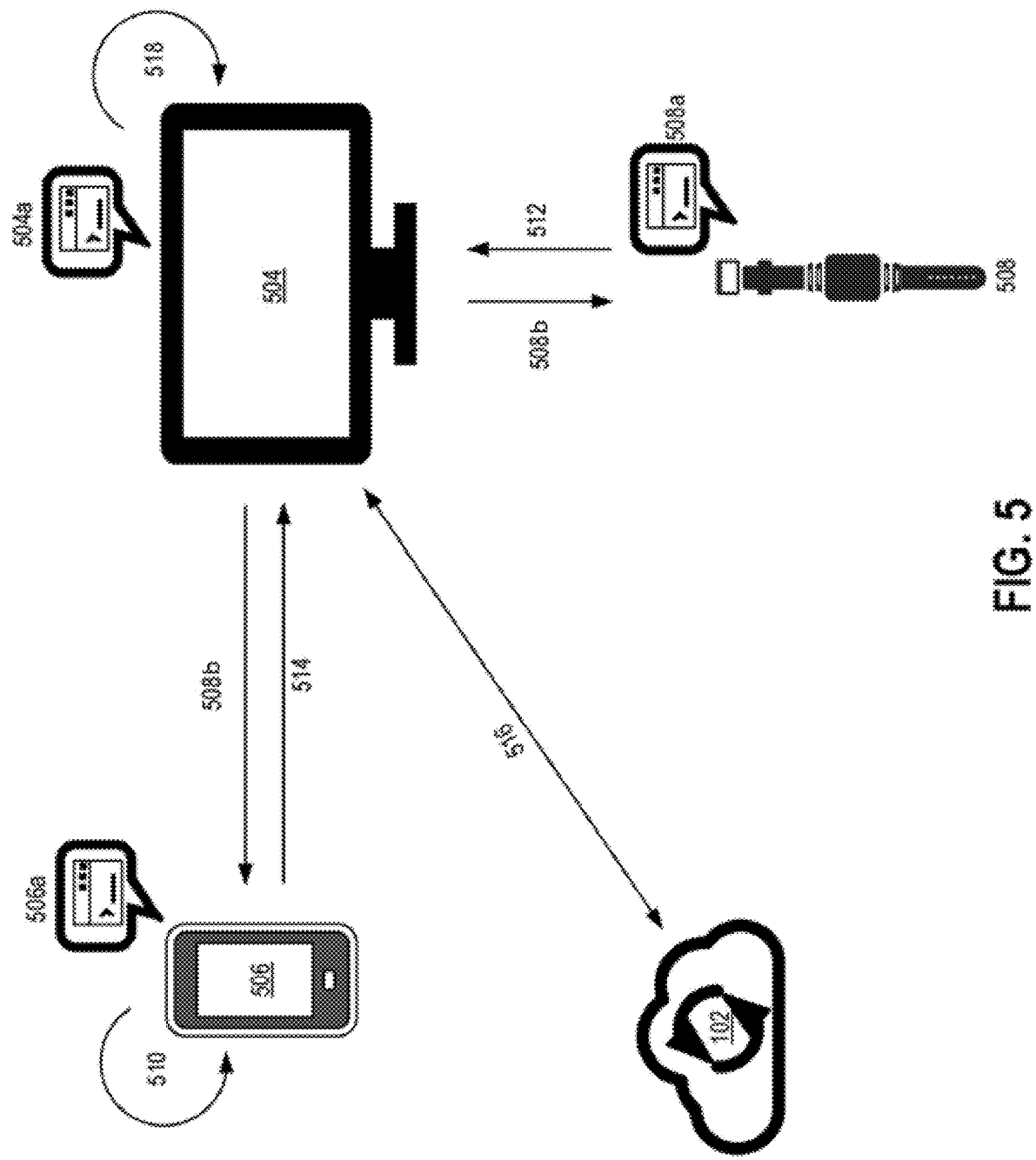
FIG. 5 illustrates example device role transitioning operations in accordance with one embodiment.

As noted above, devices may transition roles. If a managed device is granted the appropriate privilege credential(s) (described in greater detail below), that managed device can become a new managing device to manage its own and other devices' screen time. FIG. 5 illustrates example device role transitioning operations in accordance with some embodiments. In this example, a smartphone 506 may be an acting managing device that is to transition to a managed device role, while TV 504, previously a managed device, is to transition to a managing device.

It should be noted that various query procedures are contemplated in accordance with various embodiments. In a first query procedure, privilege credentials may be needed to transition a device into a managing device role. The managing device may be used to view other (managed) devices screen time data in distributed networks. In a second query procedure, privilege credentials may be needed to send a managing device-request to retrieve the screen time data associated with some (specified) or all managed devices. In accordance with the first query procedure, a role transition may be prompted. Additionally, a user might explicitly request/prompt a change from managed device role associated with a particular device to a managing role for some specific purpose, e.g., to save power, save storage space, etc. Further still, a user might wish to switch device roles to remove permission requirements to access another device's screen time data on that device. This too may trigger a role transition.

As illustrated in FIG. 5, TV 504 may broadcast a role transition message at operations 508b to other devices in the network. For example, smartphone 506 and smartwatch 508 may receive the broadcast role transition message. It should be understood that a device list can be stored on a managing device or cloud server. When a managed device tries to broadcast a role transition message, it fetches the device list from a managing device or cloud server (if the currently assigned managing device is not connected/has failed). The role transition message may then be broadcast to all other devices in the device list. In local networks, such a role transition message can be broadcast to every device, but only those devices supporting a screen time monitoring/management functionality, e.g., those devices on which a screen time management application is running, may respond to the broadcast.

Because smartphone 506 is the current managing device, it must transition to a managed device role at an operation 510. That is, upon receipt of the broadcast role transition message from TV 504, the screen time management application 506a switches to a managed role. The screen time management application 504a running on TV 504 transitions to a managing role. Smartwatch 508, which remains a managed device, is able to send its screen time data to TV 504. It should be understood that in some embodiments the current/latest screen time data may be sent, e.g., the last screen on event time may be sent by smartwatch 508 to TV 504. It should be noted that upon receipt of the broadcast role transition message, smartwatch 508 will no longer send its screen time data to smartphone 506. For example, its screen time management application 508a may update its communication parameters/settings to point to TV 504 as the managing device.

Additionally, because smartphone 506 has transitioned to a managed device, smartphone 506 will, at an operation 514, confirm its transitioned role (to a managed device) and synchronize its screen time data with TV 504. As described previously, a managing device also captures/stores its own screen time data. Thus, it can send this screen time data to TV 504, much like smartwatch 508 transmits its screen time data. It should be understood that the transmission/receipt of managed data need not necessarily occur in this order. For example, smartphone 506 may confirm its new role and synchronize its screen time data prior to smartwatch 508 transmitting its screen data to TV 504. Accordingly, TV 504/screen time management application 504a may override/update the screen time data from smartphone 506.

At an operation 516, TV 504 may communicate its new role to cloud server 102/confirm its role transition to managing device is complete. In this way, cloud server 102 is able to update its device list to reflect that smartphone 506 is now a managed device, while TV 504 is now a managing device. Moreover, new managing device, TV 504 may synchronize its data with that currently maintained by cloud server 102 in its local lookup table copy. For example, at an operation 518, TV 504/screen time management application 504a may address any conflicts, e.g., the screen time data received from cloud server 102 may be outdated by the time TV 504 assumes the role of managing device. In some embodiments, addressing such conflicts may be performed as part of the synchronization operation between smartphone cloud server 102 and TV 504. In some embodiments, TV 504 may also merge received data to generate its own lookup table in which the latest/current screen time data may be maintained.

As alluded to above, screen time associated with one or more devices may be queried or checked on a managing device, which retrieves screen time data from local storage or from the cloud server. If there is a data conflict between the managing device's local storage and the cloud server, a managed device may compare the time stamps associated with logged screen events from each copy/version of the lookup table. The copy/version having the latest time stamps can be adopted, and then synchronized to overwrite the older copy/version on the managing device's local lookup table or the cloud server. If a user initiates a screen time check remotely from a device (managed or managing), e.g., via a web browser, that screen time check can be carried out by the cloud server as if it were a managing device (similar to the above-described scenario where no managing device is specified).

In some embodiments, a managed device can query its own screen time data without privilege credentials. In some embodiments, querying another device's screen time data via a managed device may require proper privilege credentials/authentication. Although, in other embodiments, credentialing/authentication may be a configurable parameter, e.g., it may or may not be required.

If authentication is enforced, the device from which the user initiates the query may become a managing device after verifying the credentials on that device, and all the devices (both managing and managed devices) on the network go through a process of role transition (described above). Thereafter, the device is able to read local data to calculate screen time associated with any of the managed devices. If no authentication is needed, the managed device will communicate with the active managing device to retrieve screen time data to calculate screen time. That is, the querying (managed) device may obtain screen time of the relevant device during the relevant time period(s), and via its resident screen time management application, may calculate the desired screen time. In other embodiments, a query may be formed on/by the managed device, and the query may be sent to the managing device. The managing device's resident screen time management application may perform the requisite calculations, e.g., per-device screen time, aggregate screen time, etc., and the output of the calculations may be sent to the querying (managed device).

Figure 6:
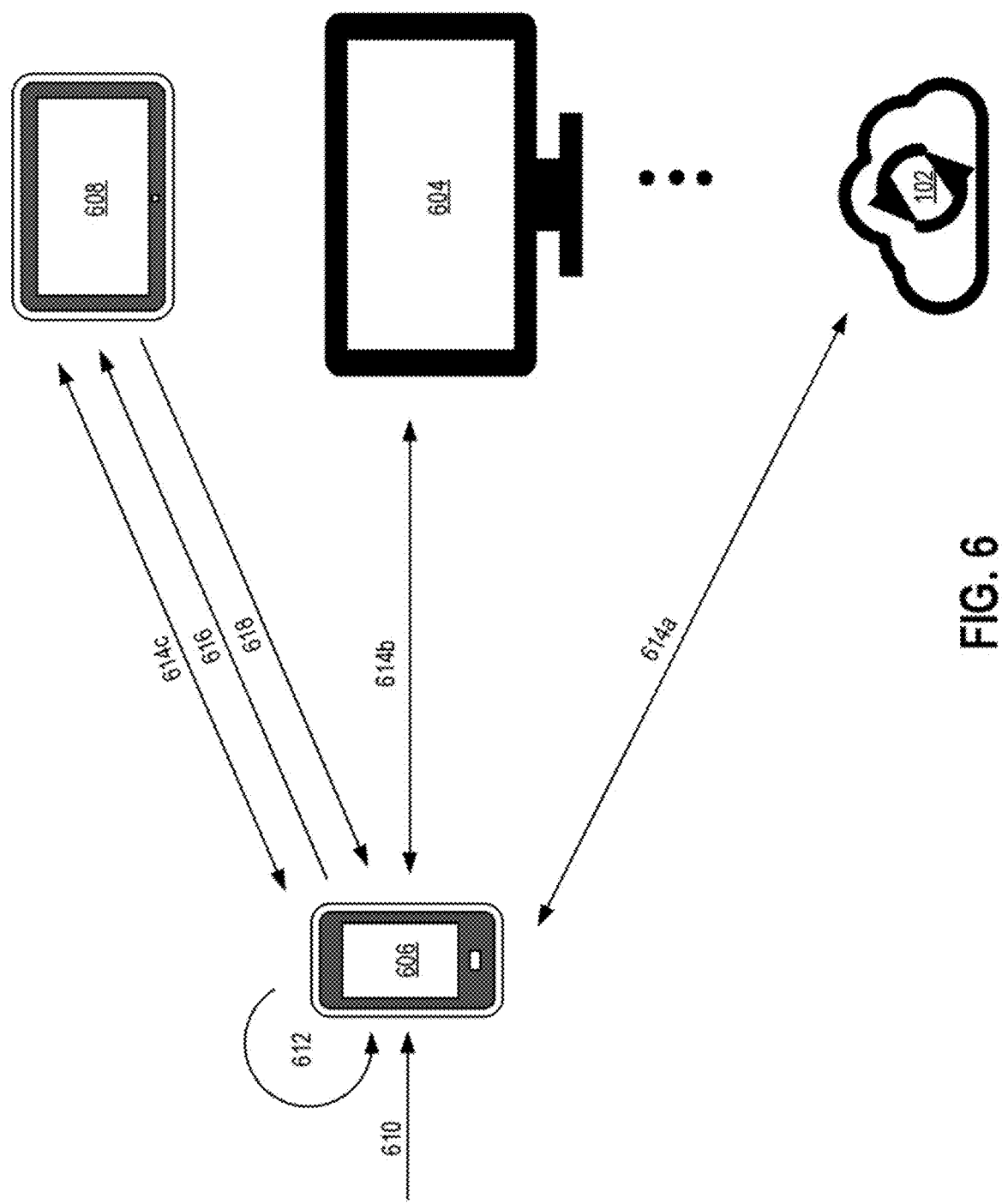
FIG. 6 illustrates example authentication and credentialing operations in accordance with one embodiment.

FIG. 6 illustrates example authentication and credentialing operations in accordance with some embodiments. In some embodiments, a user is requested to have the correct credential(s) before performing screen time management on a remote/managed device. Privilege credentials can take various forms, e.g., passwords, biometric identifiers (fingerprint, facial features, etc.), digital verifiers (barcodes, text message exchanges, tokens, etc.), and so on. Such privilege credentials can be tied to a user's device credentials, or can be set separately, depending on a user's preference. Such credential information can be stored locally on a device, on another remote device, on the cloud server, etc. In this way, the same privilege credentials can be used to perform screen time management across the network as needed (regardless of which device privilege credentials may be associated).

As illustrated in FIG. 6, smartphone 606 may be a designated managing device (either originally designated, subsequent to a role transition, etc.). At an operation 610, some form of privilege credentials may be received by smartphone 606, such as a password, fingerprint, etc., in response to a user of smartphone 606 requesting a screen time query of one or more managed devices (e.g., tablet 608, TV 604, and so on).

Smartphone 606 (or screen time management application (not shown here) may verify or authenticate the received privilege credentials, and access may be granted accordingly at an operation 612. Those skilled in the art would understand how privilege credentials may be verified/authentication may be effectuated, e.g., through an authentication server comparing expected privilege credentials to the received privilege credentials. The received privilege credentials may be synchronized between smartphone 606 and cloud server 102 at an operation 614a, as well as with managed devices, TV 604 and tablet 608 at respective operations 614b and 614c. By synchronizing the privilege credentials across cloud server 102 and the managed devices in the network, a user associated with the privilege credentials can query screen time data associated with any device in the network. At an operation 616, screen time management operations can be effectuated via, in this example, smartphone 606, e.g., screen time usage parameters, limits, thresholds, etc. may be set by a user for a desired managed device, e.g., tablet 608. For example, a user may be a parent accessing the resident screen time management application running on the user's smartphone 606 so as to effectuate screen time limits on tablet 608 used by a child of the parent. Additionally, at an operation 618, tablet 608/the screen time management application running thereon may report relevant screen time-related statistics or confirm related settings. For example, aggregate screen time associated with a specified managed device, a detailed plot indicating when the specified managed device's screen is on or off, a distribution chart of screen time spent on different devices, etc. may all be encompassed by such screen time-related statistics. Other statistics/screen time-related information are contemplated in accordance with various embodiments, the above being non-limiting examples.

In terms of screen time exceptions, devices are typically interconnected by wired or wireless networks, but sometimes may go offline due to network issues, a dead battery, entering a sleep state, go off in response to an intentional powering off of the device, are lost. etc.

To account for such screen time exceptions, devices can behave as follows in response to a screen time exception event. The managing device (or cloud server) ensures all received screen time data is stored, and the managing device can wait for the screen time exception to pass/resolve. For example, the managing device can wait for the network to which the managing and managed devices comes back up to an operational state. If a device is lost or damaged permanently, the managing device may remove the device from its lookup table, or archive screen time data associated with the device on the managing device or cloud server. For example, a user may, via the screen time management application on the managing device, manually remove the device record from the lookup table. In other embodiments, the managing device may, pursuant to some threshold time or number of ping attempts without receiving a response, remove the record associated with the device. A managed device, on the other hand, may keep collecting screen time data so long as it is operational, and continuously stores or caches the screen time data locally (in practice, a ring buffer may be optionally used to log screen time, overriding oldest data with latest if buffer is full). It may try to connect to its last known managing device, or wait for a new managing device's broadcast managing role message. The cloud server, on the other hand may simply stand by, waiting for any new connection(s) from either managing or managed devices.

When a managed devices becomes operational/resumes operation, the managing device may connect to the cloud server to check if there is any new data available to update. As noted above, various embodiments employ synchronization/conflict resolution mechanisms based on comparing time stamp data associated with screen events. If new data does exist, the managing device can add or merge data stored in the cloud server lookup table (and device list if warranted) to the managing device's own lookup table/device list. The managing device may then continue to receive screen time data from the again-operational managed devices, and operate as already disclosed herein. The managed device sends all locally cached screen time data to the managing device or cloud server, and subsequently continues to collect screen time and send data to the managing device as before any screen time exception event. As is typically performed outside the occurrence of a screen time exception event(s), the cloud server may connect to a managing device/perform managing device functions, synchronize screen time data, etc.

It should be noted that if only the cloud server is offline, and devices are operational/the network over which the devices operate is operational, the managing device, as noted above, may additionally update its device list locally, e.g., if role transition event occurs while the cloud server is offline. The managing device may then address any device list conflicts with the cloud server upon the cloud server becoming operational again, by updating the cloud server device list based on the time stamp associated with the device list update being more current than that of the cloud server device list.

In certain scenarios, network problems or hardware failures may cause the managing device to fail with respect to screen time data collection from one or more managed devices. Accordingly, managing devices may log such failures as an exception, e.g., screen-off or device-failure event type for disconnected/non-operational managed devices. Calculated screen time may then simply ignore such managed devices. Upon resuming operation, however, the managing device may update its screen time data lookup table based on the latest data from the managed device.

As noted above, screen time queries may involve screen usage associated with multiple, distributed devices, where the respective system times of such devices may not necessarily be precise or accurate, or the system times may be offset from one another. Accordingly, in some embodiments, the time associated with the network on which the various devices operate is given priority. For example, time may be gleaned for a network time service provided by a network time protocol (NTP) server of the network is taken to reflect the "correct" time as associated with various screen events, e.g., rather than device-specific time. If no network-based time can be gleaned, a device can log the time associated with a screen event based on local device system time temporarily. Prior to updating/merging screen time data with a managed device, a managing device can adjust the local device system time associated with screen events to network time. That is, loss/absence of network time can be treated (for purposes of timestamping) as a loss of network service, and when network time can be ascertained (akin to a network becoming operational again), the time can be adjusted as noted above.

In some scenarios, a particular device(s), whether a managing device or a managed device, may be used in different time zones from time to time that span the time period specified in a screen time query. In some embodiments, the managed device collects screen time data based on a current time zone in which the managed device is operating, and appends a current time zone value to the screen time data (if in a different time zone) prior to sending the screen time data to a managing device/cloud server.

The managing device (or cloud server acting as a managing device) may receive and store the screen time data time zone value as-is to record where a managed device was used. However, in generating/updating its lookup table, the managing device will translate or convert the received screen time data time zone value to universal coordinated time (UTC) to normalize the timestamps associated with screen events. When outputting or presenting screen time information or calculations in response to a screen time query, the managing device can translate the normalized UTC to the managing device's current time zone, to a time zone specified by the user, to a time zone from which a screen time query originated (if different from a managing device), etc.

An example of a lookup table entry or data element/tuple appended with a time zone value is shown below in Table 3.

TABLE 3

| Device name | ID | Screen Event Time | Type | Time Zone | Log Time (UTC) |
|---|---|---|---|---|---|
| John's phone | 123-456 | 13:20:10@2020 Nov. 1 | Screen on | UTC + 8 | 5:20:11@2020 Nov. 1 |

As noted above, calculating screen time accurately can involve accounting for scenarios where a single account is used with or across multiple devices, or where a single device is shared between multiple accounts. Accordingly, in addition to accurately calculating per-device screen time, embodiments are able to calculate per-account screen time as follows. An account-based aggregate screen time, $A_{st}$, can be set to equal device A screen time, $DA_{st}$+device B screen time $DB_{st}$+ . . . device N screen time $DN_{st}$. Any account-based aggregate screen time can be calculated in the same way and denoted with a different account identifier.

To support such account-based screen time calculations, the aforementioned lookup table can be stored with corresponding account identifiers, an example of which is set forth below in Table 4.

| Account | Device name | ID | Role | Screen Event Time | Type | Log Time |
|---|---|---|---|---|---|---|
| A | John's phone | 123-456 | managing | 13:20:10@ 2020 Nov. 01 | Screen on | 13:20:11@ 2020 Nov. 01 |
| B | John's phone | 123-456 | managed | 13:20:15@ 2020 Nov. 01 | Account switch | 13:20:16@ 2020 Nov. 01 |
| B | John's phone | 123-456 | managed | 13:20:20@ 2020 Nov. 01 | Screen off | 13:20:20@ 2020 Nov. 01 |

Depending on the parameters of a screen time query, a particular account(s) can be specified, and screen time calculations are performed taking in account only the relevant account(s) being queried (whether involving one or multiple devices). It should be noted that in some embodiments, if a user initiates a screen time query regarding a particular device that is already associated with a particular account, the device may act as a managing device, eschewing the need for authentication/entry of privilege credentials. In some device operating systems, e.g., Android, different accounts have different associated application software data, and one account is not allowed to access another account's application data for privacy reasons. In such a scenario, the same screen time management application or service will not be able to access the same stored screen time data with a different account (e.g., login) into the device. Accordingly, in some embodiments, the screen time management application/software may be implemented or run as a "built-in" operating system application rather than as, e.g., a third-party application, to avoid the need for privileged permissions to access account-specific screen time data. When an account switch occurs, or if a user logs into a new account in such a system, the screen time management application or software may synchronize the newly switched-to account's screen time data from the cloud server, address any screen time data conflicts or merge data to ensure the screen time data associated with the new account is up-to-date and complete. Screen time management may then proceed normally.

Figure 7:
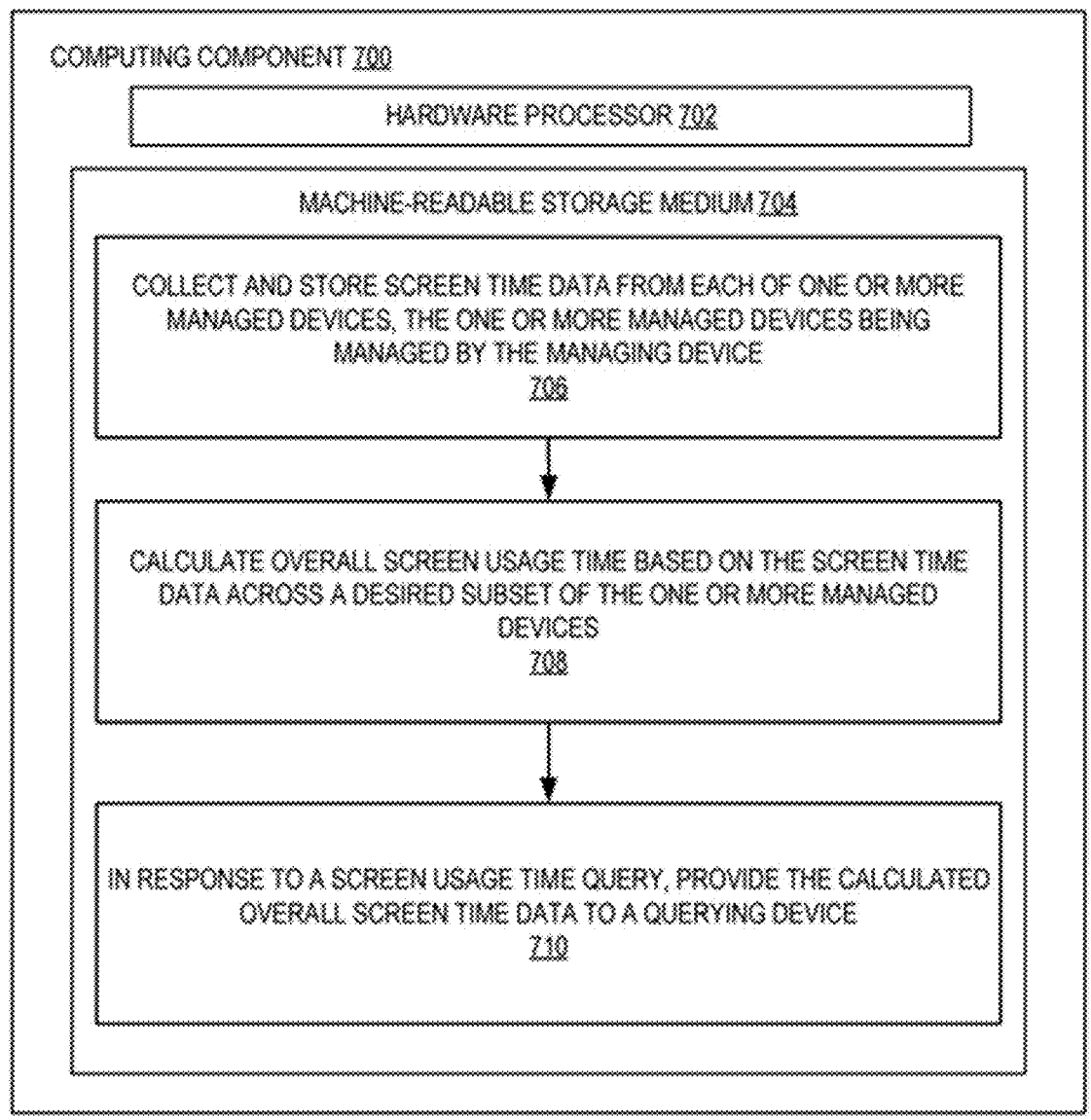
FIG. 7 illustrates an example computing component for screen time management in accordance with one embodiment.

FIG. 7 is an example computing component or device 700, such as managing device or server, for performing screen time management in accordance with various embodiments. Computing component 700 may be, for example, a computing component capable of processing data. In the example implementation of FIG. 7, the computing component 700 includes a hardware processor, 702, and machine-readable storage medium, 704. In some embodiments, as alluded to above, computing component 700 may be an embodiment of a managing device, e.g., smartphone 106 or a cloud server/similar element, e.g., cloud server 102.

Hardware processor 702 may be one or more central processing units (CPUs), semiconductor-based microprocessors, and/or other hardware devices suitable for retrieval and execution of instructions stored in machine-readable storage medium, 704. Hardware processor 702 may fetch, decode, and execute instructions, such as instructions 706-710. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-710.

Hardware processor 702 may execute instruction 706 to collect and store screen time data for each of one or more managed devices. As noted above, computing component 700 may be a managing device. Accordingly, the one or more managed devices are managed by the managing device. The managing device may act as a centralized element or function to aggregate screen time data, e.g., screen time events and associated time values, device identifiers, associated account information, and so on, from multiple devices or multiple accounts. Screen time queries may go to a managing device which maintains a lookup table (or other) data structure containing screen time data.

Hardware processor 702 may execute instruction 708 to calculate overall screen usage time based on the screen time data across a desired subset of the one or more managed devices. In some implementations, the desired subset includes at least one managed device for which a user cares about the usage time. For example, the desired subset includes at least one desired managed device for which a user set screen time usage parameters, limits, thresholds, etc. In some implementations, the desired subset is determined based on the screen usage query. As discussed above, screen time can be ascertained based on per-device basis, on a per-account basis, across multiple devices/accounts, and so on. Such flexibility can be achieved by maintaining/updating local and remote lookup tables and device lists in accordance with managing and managed device roles (which can transition amongst devices in a network). Moreover, screen time exceptions, such as device or network outages, screen-off time, and so on can be accounted for during screen time calculation as needed or as specified in accordance with screen time query parameters.

Hardware processor 702 may execute instruction 710 to, in response to a screen usage time query, provide the calculated overall screen usage time to a querying device. Calculated screen usage time can be reflected as a value that can be relayed to a querying device. However, in other embodiments, reports, graphical representations, warnings, alerts, and so on can be provided based on calculated screen usage time or calculated screen usage time relative to certain specified thresholds or limitations. In some embodiments, such calculated screen usage time can be provided on a targeted basis.

It should be noted that the functionality of various embodiments can be extended to managing screen time usage on one or more devices. For example, a set screen time limitation may be specified for a particular device. Based on the above-discussed screen time mechanisms, the screen time management software of a managing device or managed device can be used to lock or turn off or transmit/present some alert or notification upon reaching or approaching a specified screen time limit. Because the lookup table is populated with account and device-specific screen event data, limits can be set and applied as desired to specific account(s) or devices. In some embodiments, information or data regarding particular applications associated with screen events can be included in a lookup table. In this way, screen time management can be extended to control screen usage based at least in part, on use of a particular application(s), and because embodiments can take into account multiple accounts and multiple devices, screen time limits cannot be easily avoided by a user accessing an application on multiple devices. Alerts/notifications/warnings regarding approaching screen time limits can be initiated across all relevant devices, rather than simply a device currently in use. Again, this is possible due to the breadth of screen time data captured in a lookup table. In other embodiments, targeted notifications can be sent, e.g., only to devices whose last screen event was a screen on event (without a subsequent screen off event) or to a user-specified device, or particular devices associated with a particular account(s)), and so on. In still other embodiments, a messaging or communications mechanism can be added to the screen time management application to allow users to communicate regarding screen time. For example, upon receiving a notification that a user is approaching a screen time limit, the screen time management application may allow the user to request additional screen time from the user/device from which the screen time limit was set. Further still, any and all screen time data captured and stored can be presented/analyzed as aggregate or individual statistical data/trends, reports (textual, graphical, etc.), heat maps, rankings, and so on.

Although various embodiments described/illustrated herein are presented in the context of screen time management relative to physical devices, virtual entities on a computer/computing device or on networks can be considered an individual virtual device. Such virtual devices can be used as a reference to calculate screen or active time, and need not be limited to "screen" time. Examples of such activities that can be considered include, but are not limited to the following: system-level virtual machine operating time, where such virtual machines may be running as a hardware emulation on the same physical computer, e.g., VirtualBox, Vmware, etc.; process-level virtual machines running as a normal process inside a host operating system, e.g., a Java virtual machine, Windows.NET framework etc.; operating system-level virtual machines running on the same operating system, e.g., Docker, Container, LXC etc.; system software component modules or services running in some operating system framework, e.g., Windows Manager, MediaPlayer Service in Android, etc.; application software running on some operating system, like an Android application; or some group/collection of software components or applications, such as all gaming/education/productivity category type applications on one or multiple devices.

Figure 8:
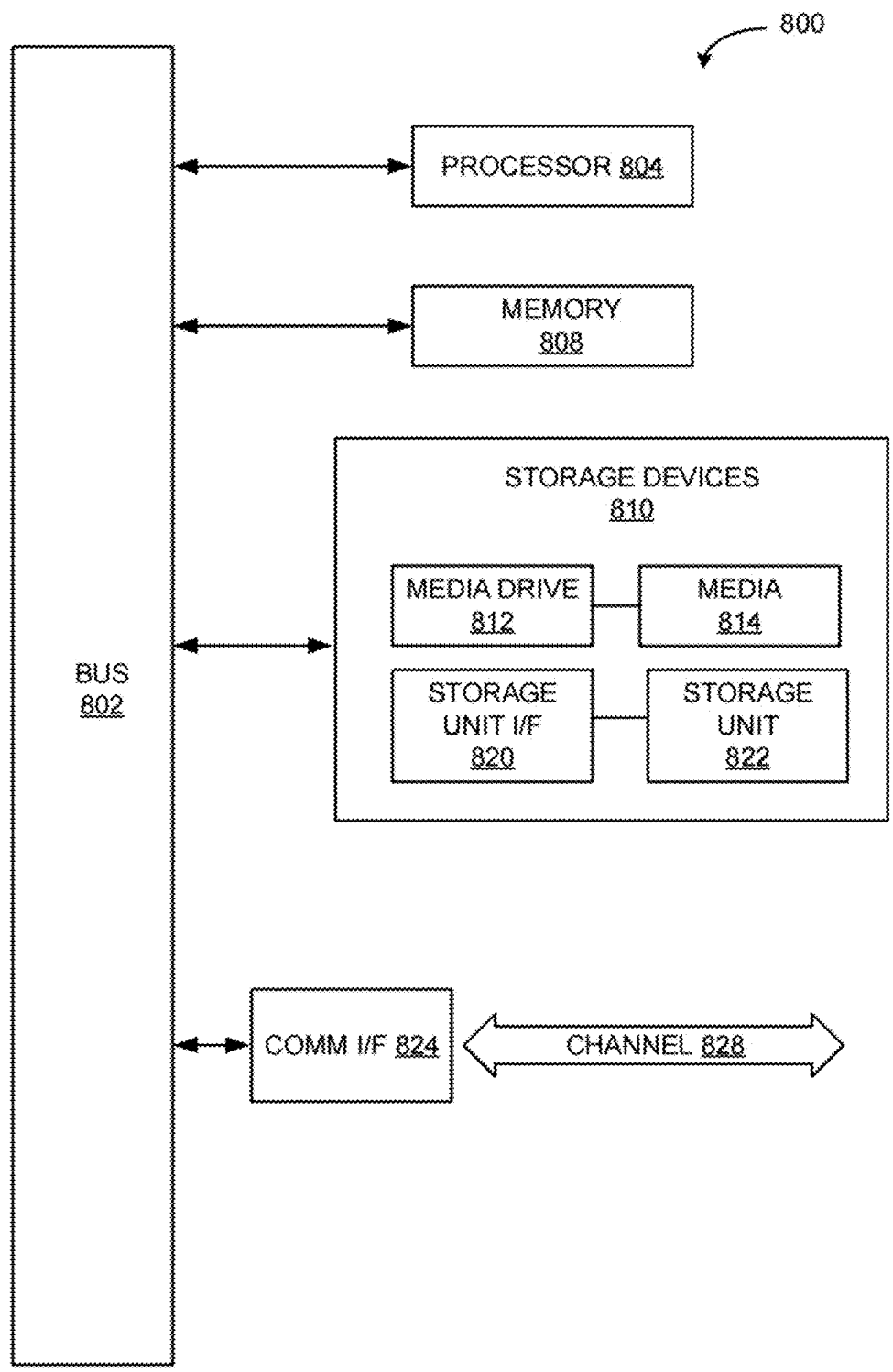
FIG. 8 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smartphones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. This can include a processor 804. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices.

Examples of communications interface 824 might include a modem or softmodem, a network interface (such as Ethernet, network interface card, IEEE 802.XX or other interfaces). Other examples include a communications port (such as for example, a USB port, IR port, RS232 port Bluetooth® interface, or other port), or other communications interfaces. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 822, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A managing device, comprising:
  a processor; and
  a memory unit operatively coupled to the processor, the memory unit including computer code that when executed causes the processor to:
    collect screen time data from each of one or more managed devices, and store the screen time data, the one or more managed devices being managed by the managing device;
    calculate overall screen usage time based on the screen time data across a desired subset of the one or more managed devices; and
    in response to a screen usage time query, provide the calculated overall screen usage time to a querying device;
  wherein the memory unit includes computer code that when executed causes the processor to:
    calculate the overall screen usage time based on a difference between times of occurrences of screen events and exclude screen event exceptions during the calculation of the overall screen usage time, wherein the screen events comprise screen on and screen off events, and the screen event exceptions comprise the screen off events, device downtime or failure, and overlapping usage screen events;
  wherein the memory unit includes computer code that when executed causes the processor to:
    record a reference count of screen on events among the one or more managed devices, wherein the reference count greater than one indicates the overlapping usage screen event; and
    in response to the reference count being greater than one, exclude a screen on event that causes the reference count to be greater than one, from the calculation of the overall screen usage time; and
  wherein the memory unit further includes computer code that when executed further causes the processor to:
    enforce, based on the calculated overall screen usage time meeting or approaching a threshold, screen time limits on the one or more managed devices.

2. The managing device of claim 1, wherein the memory unit includes computer code that when executed causes the processor to:
  store the screen time data in a lookup table maintained by the managing device; and
  synchronize the screen time data with a remote copy of the lookup table maintained by a remote server operatively connected to the managing device.

3. The managing device of claim 1, wherein the screen time data comprises device identifying information, screen events occurring or having occurred at each of the one or more managed devices, and timestamps identifying times of occurrences of the screen events.

4. The managing device of claim 3, wherein the memory unit includes computer code that when executed causes the processor to:
  normalize the timestamps to a universal coordinated time prior to calculating the overall screen usage time.

5. The managing device of claim 1, wherein the screen event exceptions further comprise non-operational screen events, and the memory unit includes computer code that when executed causes the processor to:
  determine a screen off event for a non-operational managed device, as a non-operational screen event; and
  exclude the determined non-operational screen event from the calculation of the screen usage time.

6. The managing device of claim 1, wherein the memory unit includes computer code that when executed causes the processor to:
  aggregate screen time data associated with single account usage across a plurality of managed devices of the one or more managed devices during the calculation of the screen usage time.

7. The managing device of claim 1, wherein the managing device comprises a cloud server operatively communicating with the one or more managed devices.

8. The managing device of claim 1, wherein the memory unit includes computer code that when executed causes the processor to:
  collect and store screen time data associated with the managing device; and
  aggregate the screen time data associated with the managing device and the screen time data from each of one or more managed devices.

9. The managing device of claim 1, wherein the memory unit includes computer code that when executed causes the processor to:
  broadcast a managing role message to the one or more managed devices to initiate the collection of the screen time data.

10. The managing device of claim 1, wherein the memory unit includes computer code that when executed causes the processor to:
  obtain, from a remote server, a copy of a device list identifying each of the one or more managed devices as being associated with a managed role and the managing device as being associated with a managing role.

11. The managing device of claim 10, wherein the memory unit includes computer code that when executed causes the processor to:
  transition to a managed device role upon receipt of a role transition message broadcast from one of the one or more managed devices.

12. The managing device of claim 11, wherein the memory unit includes computer code that when executed causes the processor to:
  synchronize the copy of the device list with an updated device list at the remote server reflecting the transition.

13. A method for managing screen time, comprising:
  collecting, by a first computing device of a plurality of computing devices, activity data from a remaining subset of the plurality of computing devices, the remaining subset of the plurality of computing devices being managed by the first computing device;
  calculating, by the first computing device, activity time based on the activity data across one or more computing devices of the remaining subset of the plurality of computing devices; and
  transmitting information reflecting the calculated activity time of the one or more computing devices of the remaining subset of the plurality of computing devices;
  wherein the activity time is overall screen usage time, and the calculating, by the first computing device, activity time based on the activity data across one or more computing devices of the remaining subset of the plurality of computing devices, comprises:
    calculating the overall screen usage time based on a difference between times of occurrences of screen events, and excluding screen event exceptions during the calculation of the overall screen usage time, wherein the screen events comprise screen on and screen off events, and the screen event exceptions comprise a screen off time, a device downtime or failure, and an overlapping screen time usage;
  wherein the excluding screen event exceptions during the calculation of the overall screen usage time, comprises:
    recording a reference count of screen on events among the one or more computing devices of the remaining subset of the plurality of computing devices, wherein the reference count greater than one indicates an overlapping usage screen event; and
    in response to the reference count being greater than one, excluding a screen on event that causes the reference count to be greater than one, from the calculation of the overall screen usage time; and
  wherein the method further comprises:
    enforcing, based on the calculated activity time meeting or approaching an activity time limit threshold, activity time limits on the one or more of the remaining subset of the plurality of computing devices.

14. The method of claim 13, wherein each of the plurality of computing devices comprises at least one of physical and virtual computing devices.

15. The method of claim 14, wherein the activity data reflects activity associated with at least one of operations, applications, software components, and groups thereof executing on the at least one of the physical and virtual computing devices.

16. A non-transitory computer-readable storage medium, having program codes stored therein that, when executed by a processor, cause a method for managing screen time to be implemented, the method comprising:
  receiving screen time data transmitted by a plurality of computing devices, the screen time data comprising screen-on time and screen-off time;
  calculating overall screen usage time based on a difference between the screen-on time and the screen-off time of each of the plurality of computing devices; and
  providing, in response to a screen usage time query transmitted by a querying device, the calculated overall screen usage time to the querying device;
  wherein the calculating overall screen usage time based on a difference between the screen-on time and the screen-off time of each of the plurality of computing devices, comprises:
    calculating the overall screen usage time based on a difference between the screen-on time and the screen-off time of each of the plurality of computing devices, and excluding screen event exceptions during the calculation of the overall screen usage time, wherein the screen event exceptions comprise the screen-off time, a device downtime or failure, and an overlapping screen time usage;

wherein the excluding screen event exceptions during the calculation of the overall screen usage time, comprises:

recording a reference count of screen-on events among the plurality of computing devices, wherein the reference count greater than one indicates an overlapping usage screen event; and in response to the reference count being greater than one, excluding a screen-on event that causes the reference count to be greater than one, from the calculation of the overall screen usage time; and wherein the method further comprises:

enforcing, based on the calculated overall screen usage time meeting or approaching a threshold, screen time limits on the plurality of computing devices.

17. The managing device of claim 1, wherein the memory unit includes computer code that when executed causes the processor to:

append event type and time information into an event queue in order, wherein in the event queue is a first-in-first-out queue; and iterating through the event queue to obtain the overall screen usage time.

* * * * *